form time to time replaced. In the self contained machines there is usually no provision for adjusting the shaft bearings, and no means for centering the rotor. Consequently if on account of inaccuracies of machining the rotor is not centered when the parts are originally assembled, the efficiency of the machine is low, operation unsatisfactory, and the life of the machine comparatively short, and even if the rotor is accurately centered when originally assembled it can only be maintained so by replacing the bearings from time to time.

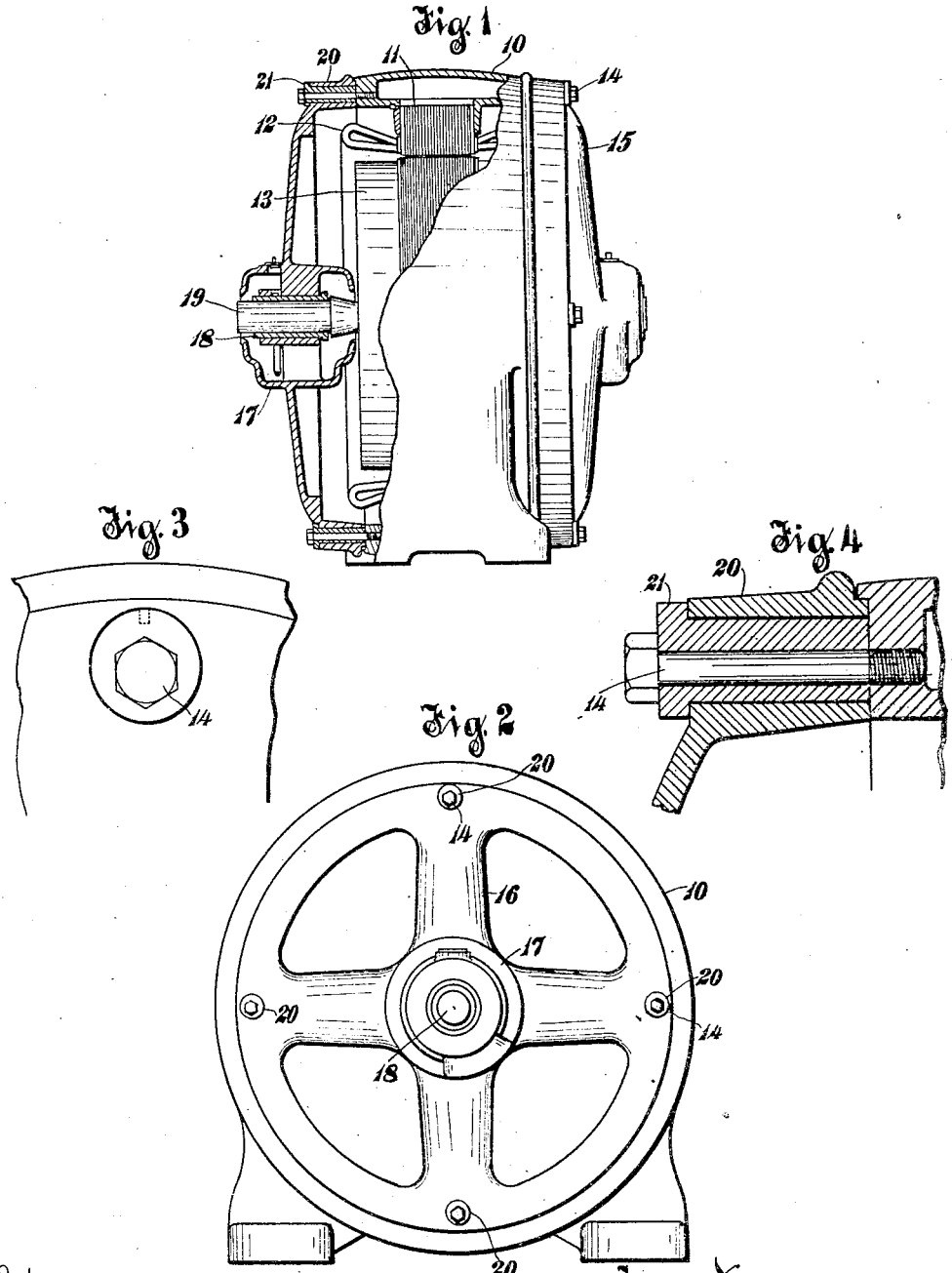

UNITED STATES PATENT OFFICE.

EMIL MATTMAN, OF NORWOOD, OHIO, ASSIGNOR, BY MESNE ASSIGNMENTS, TO ALLIS-CHALMERS MANUFACTURING COMPANY, A CORPORATION OF DELAWARE.

ADJUSTABLE END HEAD FOR DYNAMO-ELECTRIC MACHINES.

1,122,213.  Specification of Letters Patent.  Patented Dec. 22, 1914.

Application filed September 24, 1906. Serial No. 336,005.

*To all whom it may concern:*

Be it known that I, EMIL MATTMAN, citizen of the Republic of Switzerland, residing at Norwood, in the county of Hamilton and State of Ohio, have invented certain new and useful Improvements in Adjustable End Heads for Dynamo-Electric Machines, of which the following is a full, clear, and exact specification.

My invention relates to dynamo-electric machines and particularly to the so-called self-contained machines or to those machines the shafts of which are mounted in the bearing-housings or end-heads.

In some machines such as induction motors, it is necessary that the air gap be made very small in order that the efficiencies may be as high as possible. The length of the air gap of such a machine depends principally upon the size of the machine, varying from about twelve thousandths of an inch for small machines to about eight hundredths of an inch for large machines. Therefore in case the parts are not very accurately machined or assembled the length of the air gap is not uniform at all parts of the rotor. In the small machines a very slight inaccuracy in machining causes a comparatively large variation in the air gap at opposite sides of the rotor. Furthermore the wearing away of the bottoms of the bearings causes the air gap at the bottom of the machine to become less than at the top. This is particularly true of large machines having rotors of considerable weight.

The attraction between the stator and rotor is proportional to the length of the air gap and therefore when the air gap at different parts of the machine is unequal the attractions at those parts are unequal. Consequently if the rotor is not accurately centered when the parts are assembled or if the lower parts of the bearings have been worn away even a slight amount resulting in a smaller air gap at the bottom of the rotor than at the top, the attraction between the stator and rotor at the bottom is much greater than at the top. This unequal attraction causes a pressure on the bearings in addition to that due to the weight of the rotor. As the difference in the air gap at the top and bottom increases, the abnormal pressure increases results in a rapid wearing away of the bearings. The result is that the machine soon becomes useless unless the bearings are from time to time replaced. In the self contained machines there is usually no provision for adjusting the shaft bearings, and no means for centering the rotor. Consequently if on account of inaccuracies of machining the rotor is not centered when the parts are originally assembled, the efficiency of the machine is low, operation unsatisfactory, and the life of the machine comparatively short, and even if the rotor is accurately centered when originally assembled it can only be maintained so by replacing the bearings from time to time.

The object of my invention is to provide means whereby the position of the rotor can, when necessary, be adjusted so as to equalize the torque at all parts of the machine.

In carrying out my invention, I provide means for adjusting the end-housings of the machine.

More specifically considered my invention consists in providing adjustable bushings for the bolts which secure to the machine the end-housings or the end-heads in which the shaft bearings are mounted. With this construction the end-housings can at any time be adjusted so as to adjust the position of the rotor.

For a better understanding of my invention reference is had to the accompanying drawings in which—

Figure 1 is an elevation of a machine equipped with my invention, parts being broken away and in section; Fig. 2 is an end view of the same; Fig. 3 is an enlarged end view of a portion of the machine showing one of the adjustable bushings; and Fig. 4 is an enlarged transverse section through one of the ends having bolts and adjustable bushings.

Referring now to figures of the drawing I have shown at 10 a stationary field frame or yoke carrying on its inner side the core 11 on which are mounted the stator windings 12.

At 13 is shown the rotary member which is adapted to rotate within the stator core 11. The particular machine illustrated is an induction motor having a very narrow air gap as is shown in Fig. 1. Secured to each end of the field frame or yoke by bolts 14 is an end-housing or end-head 15, provided in this case with radial arms 16, and a bearing-housing 17 integral therewith. The bearing-housings support the shaft-bearings 18 in which is mounted the rotary shaft 19.

In order to provide means for adjusting the end-housings or end-heads and hence the shaft and rotor, to center the latter so that the air gap may be made equal at all parts of the rotor, I provide in the end-housings for each bolt an adjustable eccentric bushing or sleeve 20. Each eccentric bushing is provided on the exterior of the end-head, with a flange 21 to which a socket wrench or other tool may be applied for the purpose of adjustment.

When it is desired to adjust the position of the shaft and rotor, the bolts 14 are first slightly loosened and the eccentric bushings 20 can then be rotated in the proper direction by a suitable tool until the rotor is in the desired position. After the bushings are adjusted the bolts 14 are again tightened into position so as to hold the bushings and housings firmly in place.

I do not wish to be confined to the details shown, but aim in my claims to cover all modifications which do not involve a departure from the spirit and scope of my invention.

What I claim as new and desire to secure by Letters Patent is:—

1. In a dynamo-electric machine, a frame or yoke, end-heads, bolts for securing said end-heads to said frame or yoke, and eccentric bushings surrounding said bolts.

2. In a dynamo-electric machine, a frame or yoke, end-heads carrying shaft bearings, bolts for securing the end-heads to the frame or yoke, and adjustable eccentric bushings surrounding said bolts whereby the positions of the end-heads and shaft bearings may be adjusted.

3. In a dynamo-electric machine, a frame or yoke, end-heads, a shaft mounted in said end-heads, bolts for securing the end-heads and the frame or yoke together, and eccentric bushings surrounding said bolts and adjustable to change the relative positions of the end-heads and the frame or yoke.

4. In a dynamo-electric machine, a frame, an end-head, a rotor shaft mounted in said end-head, and means comprising an eccentric supported by the frame and having a cylindrical surface bearing on a portion of the end-head for adjusting the relative position of said frame and end-head.

5. In a dynamo-electric machine, a frame, an end-head, a shaft rotatable in said end-head, and means for adjusting the relative positions of said frame and said end-head, said means comprising a plurality of rotatable eccentrics mounted on said frame and in engagement with said end-head.

6. In a dynamo-electric machine, a frame, an end-head, a shaft rotatable in said end-head, and means for adjusting the relative positions of said frame and said end-head, said means comprising a rotatably mounted eccentric supported by one of said parts and in engagement with another part.

7. In a dynamo-electric machine, a frame, an end-head, a shaft rotatable in said end-head, and means for adjusting the relative positions of said frame and said end-head, said means comprising a rotatably mounted eccentric in engagement with said end-head.

In testimony whereof I affix my signature, in the presence of two witnesses.

EMIL MATTMAN.

Witnesses:
  ARTHUR F. KWIS,
  FRED J. KINSEY.

Copies of this patent may be obtained for five cents each, by addressing the "Commissioner of Patents, Washington, D. C."